Figure 1:
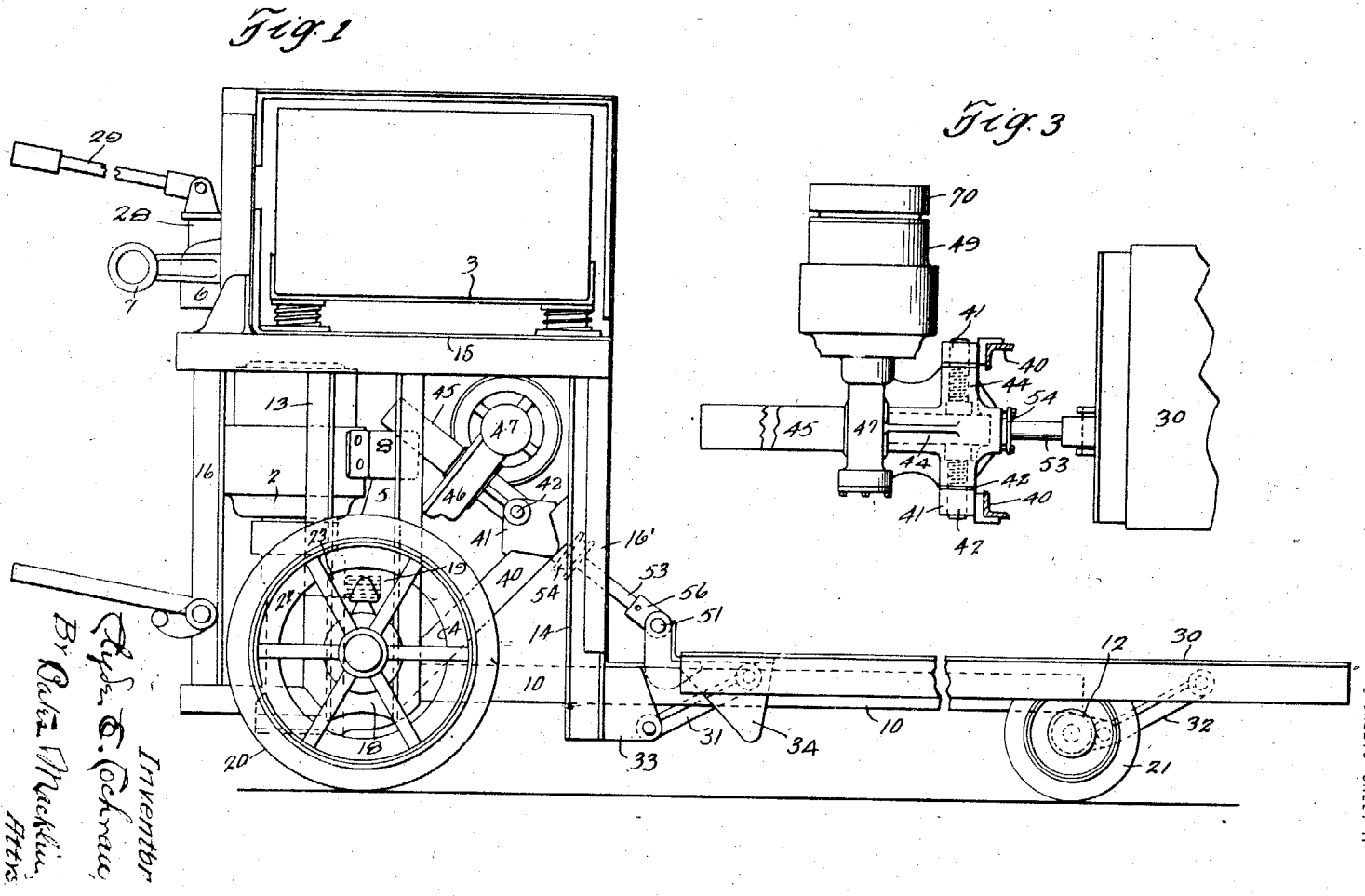

C. E. COCHRAN.

INDUSTRIAL TRUCK.

APPLICATION FILED FEB. 24, 1919.

Reissued Nov. 28, 1922.

15,497.

3 SHEETS—SHEET 1.

Inventor
Clyde E. Cochran,
By Bates & Macklin,
Attys.

C. E. COCHRAN.

INDUSTRIAL TRUCK.

APPLICATION FILED FEB. 24, 1919.

Reissued Nov. 28, 1922. 15,497.

3 SHEETS—SHEET 2.

Inventor
Clyde E. Cochran,
By
Baker & Macklin, Attys.

C. E. COCHRAN.

INDUSTRIAL TRUCK.

APPLICATION FILED FEB. 24, 1919.

Reissued Nov. 28, 1922.

15,497.

3 SHEETS—SHEET 3.

Inventor
Clyde E. Cochran,
By Baker & Macklin,
Attys.

Reissued Nov. 28, 1922. Re. 15,497

UNITED STATES PATENT OFFICE.

CLYDE E. COCHRAN, OF CLEVELAND, OHIO, ASSIGNOR TO THE EL[illegible]ELL-PARKER ELECTRIC COMPANY, OF CLEVELAND, OHIO, A CO[illegible]PORATION OF OHIO.

INDUSTRIAL TRUCK.

Original No. 1,260,145, dated March 19, 1918, Serial No. 130,518, filed November 10, 1916. Application for reissue filed February 24, 1919. Serial No. 278,999.

*To all whom it may concern:*

Be it known that I, CLYDE E. COCHRAN, a citizen of the United States, residing at Cleveland, in the county of Cuyahoga and State of Ohio, have invented a certain new and useful Improvement in an Industrial Truck, of which the following is a full, clear, and exact description, reference being had to the accompanying drawings.

This invention relates to automobile trucks, which, in addition to the frame, supporting wheels and propelling mechanism have suitable means carried by the frame for shifting a load relatively to it, enabling the load to be conveniently picked up and shifted into position for transportation by the truck, and thereafter deposited in a desired new location. Such trucks, are of great use in factories, warehouses, freight stations, etc., for handling goods with the minimum of manual assistance.

The object of this invention is to provide a simple, effective and powerful mechanism adapted to be mounted on the truck frame and manipulate the load. This mechanism comprises a load engaging member movably carried by the truck frame, a longitudinally movable rod for operating it, a screw and nut couple for moving the rod, and an operating motor. Preferably the rod carries the screw thread which is engaged by the nut, and the latter preferably carries worm teeth meshing with a worm driven directly by the armature shaft of the motor. The motor, gearing, nut and screw are all mounted to swing as a unit about a horizontal axis so that these parts may accommodate themselves to various directions of the rod corresponding to various positions of the load shifting mechanism.

The mechanism which engages and supports the load will be varied according to the character of load to be picked up, and transported, and may include a linkage system connecting the load carrier with the truck frame, which system would also be varied according to the movement desired for the load engaging mechanism.

One embodiment of the invention which has been found very useful is where the load-engaging mechanism is a horizontal platform adapted to be elevated to engage a load which has been so supported that the truck may back the platform beneath it. In this case the preferred linkage system includes inclined links connecting the horizontal platform with the truck frame so that a pull on the end of the platform will cause it to rise.

Figure 2:
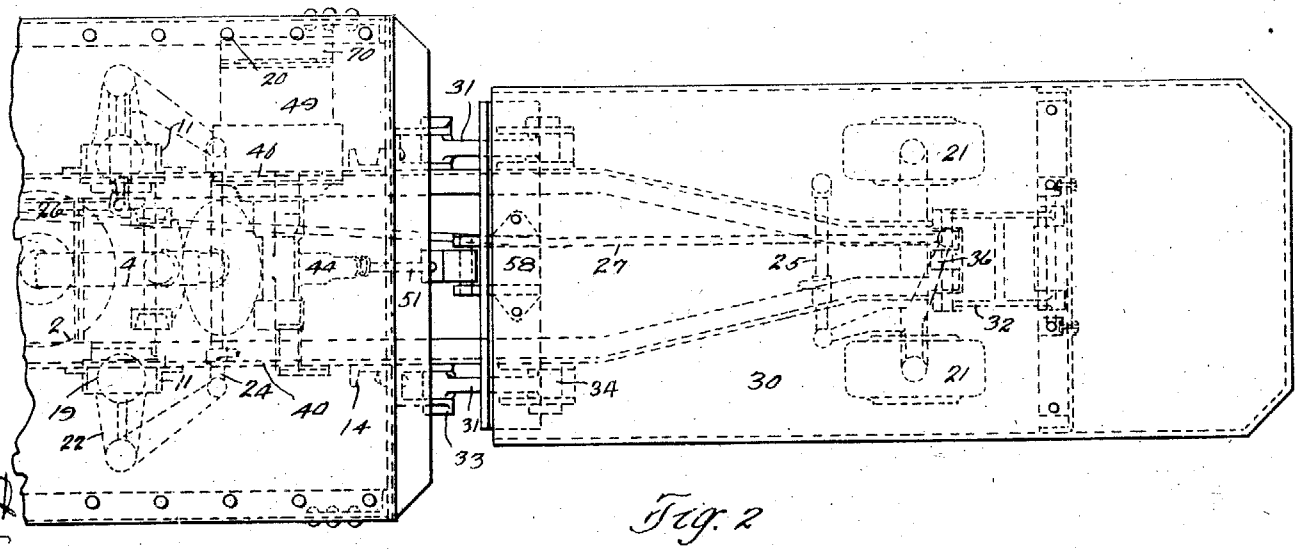
Figure 4:
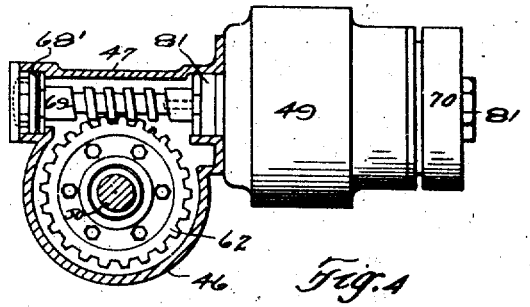
Figure 5:
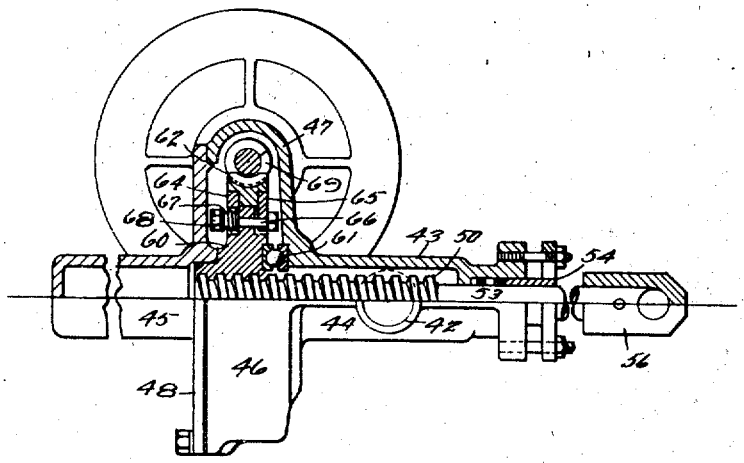
Figure 6:
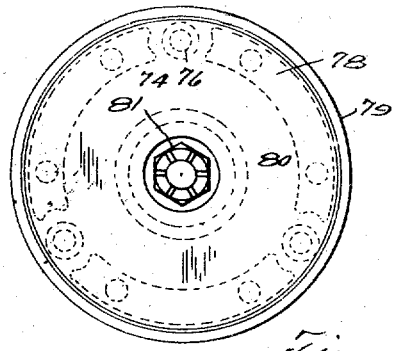
Figure 7:
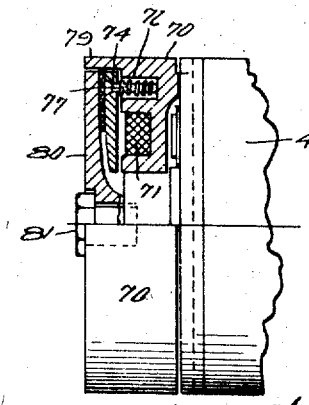

The drawings illustrate my invention embodied in a truck having a horizontal vertically-raisable platform. In these drawings, Fig. 1 is a side elevation; Fig. 2 is a plan; Fig. 3 is a view in the nature of a plan on an enlarged scale of the motor and mechanism connecting it to the platform; Fig. 4 is a section through the worm wheel and the worm with the motor shown in side elevation; Fig. 5 is a section along the axis of the screw which elevates the platform, showing the motor in end elevation; Fig. 6 is an elevation of the brake mechanism, looking toward the end of the motor casing; Fig. 7 is a sectional side elevation of the brake mechanism looking from the opposite direction of Fig. 4.

Referring briefly to the general construction shown, 1 indicates a front housing carrying a driving motor indicated at 2, and a battery therefor in a suitable box 3. Extending rearwardly from the lower portion of this front housing is a low lying skeleton frame 10. Suitably mounted on the sides of the housing are the propelling wheels 20, and carried by the rear frame are the wheels 21. The driving motor is suitably connected with the propelling wheels 20 in any well known manner; thus the motor may be connected by worm gearing (not shown) in the casing 4 with the rotary axles of the wheels. The motor is controlled by a suitable controller indicated at 6, which is provided with an operating handle 7. The steering may be accomplished in any desired manner. For example, all four wheels may be steered, the wheels being shown in Fig. 2 as connected by a system of cross links 24 and 25, and longitudinal links 26 and 27, with a steering column 28 (Fig. 1) operated by a hand lever 29.

It is to be understood that the general construction just described may be altered as desired. In the specific embodiment shown in the drawings, the sills 10 are secured at the front to upright frame bars 11 and at the rear to an axle 12. These sills are located at some distance within the outer edges of the platform, and may conveniently be channel beams, as shown. The front housing has other uprights 13 and 16 secured at their lower ends to extensions 17 of the sill frame. The sill frame is completed by pads 18 and 19 rigidly connected with the uprights 11 and 13. The housing also has two uprights 14 of channel shape secured to the outer sides of the sills 10 and rising vertically at the rear end of the housing. All of the uprights are secured to the horizontal flanged plate 15 which carries the battery box. A vertical plate 16′ forms a rear wall for the housing and is secured to the uprights 14.

The arrangement described, of sills, uprights 11 and 13, and cross pads 18 and 19, provides a box-like space in which the front axle may rise and fall. The frame is preferably supported by springs 23, between the pads 19 and the floating casing 22 of the axle, after the manner of a journal box of a railway car. The motor rises and falls with the axle, being connected with it by the gear casing 4 and also by a brace 5 leading upwardly from the axle and connected at the upper end by a bracket 8 to the motor casing. This driving connection is simple, direct and compact, and the spring suspension relieves the truck, and its load, of jars.

The raisable platform, which constitutes the load engaging member in this particular embodiment, is shown in Figs. 1 and 2 and designated 30. This platform is a horizontal member connected with the sill structure by parallel links 31 and 32. There are two links 31 on the outer sides of the sills 10 and pivoted at their lower ends to brackets 33 which are secured to the sills and to the rear end of the front housing. The upper ends of these links are pivoted to brackets 34 secured to the under face of the platform. At the rear I prefer to employ one link 32 which is mounted centrally beyond the sills and pivoted at its lower end at 36 to the stationary axle of the smaller wheels, and at its upper end to the under side of the platform. These links 31 and 32 are shown as webbed for strength. They are of the same length and are parallel, so that as the platform moves it remains always horizontal, moving upwardly and toward the front as it rises and downwardly and rearwardly as it is lowered.

The motor, gearing and screw for elevating the platform are carried within the housing 1 in the space immediately in front of the upright posts 14 and beneath the support 15 for the battery box. 40 designates two inclined angle bars riveted at their upper ends to the posts 14 and extending downwardly and forwardly and riveted at their lower ends to one set of posts 11. Mounted on these diagonal bars 40 are bearing brackets 41. Into these brackets extend trunnions 42 carrying an oscillating frame 44. This frame is hollow to provide casings for the screw, for the worm wheel and for the worm, the latter portion of the casing being extended to and being rigidly connected with the motor casing 49. Accordingly, the motor, the gearing and the screw are all pivotally mounted by the trunnions 42.

It is desirable to have the above casing separable, to allow ready installation and access to the worm, for oiling, etc. Accordingly, I prefer to make the casing for the worm wheel and nut in two parts. The main portion 46 of the worm wheel casing may conveniently be integral with the casing 47 for the worm, and with the casing 43, for that portion of the screw between the nut and platform, as shown in Fig. 5. The projecting end of the screw is housed by a tubular casing 45 which extends from a plate 48 which is bolted to the casing 46. Suitable webs are provided to strengthen and stiffen the parts of the casing which as shown may conveniently be made by two castings. The trunnions 42 may be studs screwed into the casing 43.

The screw 50 is shown clearly in Fig. 5. It lies within the casings 43 and 45 and has a shank 53 extending out through a stuffing box 54 at the lower end of the casing. This shank is provided at its lower end with a head 56 which is connected by a pivot pin 51 with a bracket 58 secured to the forward end of the elevating platform 30. Within the casing 46 and threaded on the screw is a nut 60 which is shown as taking its thrust against a ball bearing 61 in the casing. This nut carries at its outer edge teeth of a worm wheel. These teeth are on a ring 62 separate from the body of the nut but connected with it by a friction clamp consisting of a flange 64 on the nut and a ring 65, bolts 66 and nuts 68, and springs 67 compressed between the body of the nut 60 and the nuts 68. By these means sufficient friction is maintained at the clamp so that normally the worm teeth and the nut revolve as a unit, but slippage is possible in case of an excessive load on the platform or other abnormal condition. The separation of the teeth and body of the worm wheel also allows the teeth to be made of bronze and the body of steel, which is an advantage.

The worm for driving the worm wheel described is designated 69. It is mounted in the casing 47, and meshes with the worm teeth 62, and is connected to the shaft of the armature. As shown in Fig. 4, the thrust of the worm is taken in either direction by a double ball bearing 68′, mounted in the end of the worm casing 47. The other end of the worm is connected by a suitable coupling to the armature shaft 81. This coupling is shown as consisting of a square extension on the armature shaft engaging a corresponding recess in the worm.

It will be seen from the above construction that when the armature is revolved, the worm causes the nut to revolve comparatively slowly, which more slowly pulls up on the screw shaft 53 to elevate the platform. Oil for the worm gearing and for the nut and screw are contained within the hollow casing, being retained therein by the stuffing box 54.

In the operation of the truck shown, it is usually backed to bring the platform under the goods to be carried; then the raising motor is operated, which, through the gearing, nut and screw described, draws up on the shank 53 and elevates the platform, swinging it upwardly and forwardly until the load is picked up; then the truck is driven to the desired position with the load in this condition, after which the motor 49 is reversed and the platform is lowered to allow the load to descend onto a suitable support. The speed of the armature is preferably such that the load is quickly raised, the reduction in the gearing giving the requisite power.

Any suitable means may be employed to open the circuit to the raising motor automatically when the platform reaches its uppermost or lowermost position, thus preventing the motor driving too far. The slip connection in the worm wheel also protects the mechanism. As an additional protection I provide a magnetic brake which is held in idle position when the current is flowing through the raising motor, but is automatically seated by spring action whenever the current is interrupted. Accordingly, whenever the current is off the brake is on. As the current is automatically broken at the extreme positions of the platform, the operation of the raising motor is immediately stopped at these positions. The brake is located on the end of the motor casing opposite to the worm drive, and is shown particularly in Figs. 6 and 7 and will now be described.

Secured directly to the end of the motor casing is a housing 70 formed with an annular recess to accommodate an annular winding 71 which is in series with the motor. The annular portions of the housing on opposite sides of this winding form north and south poles of a magnet. 74 indicates a ring-like piece of metal which constitutes an armature for the magnet described. This armature is normally held distant from the magnet by means of springs 76 mounted in recesses in the housing and bearing against the armature ring. Suitable studs 77 carried by the housing guide the ring. Secured at intervals on the ring are segmental linings 78 of suitable braking substance.

The springs 76 tend to press the armature ring with the linings outwardly into contact with a disk 80 secured to the end of the armature shaft. This disk lies within a flange 79 of the housing 70. Normally the brake is held active by the springs 76, preventing the armature revolving and thus holding the platform in a definite position. When, however, the current is turned into the raising motor the winding 71 is energized and the armature 74 is drawn inwardly away from the disk 80 and this disk freed.

Having thus described my invention, what I claim is:

1. In an industrial truck, the combination of a front housing, a rearwardly extending sill frame, a movable load carrier, mounted on the sill frame, an electric motor, a connection between said motor and the load carrier, including a nut and screw, one geared with the armature shaft and the other connected to the load carrier, and a pivotal support for the motor, nut and screw, pivoted to the front housing between the motor and load carrier, whereby the weight of the motor may act as a counter balance.

2. In a truck of the character described, the combination of a truck frame, a hollow casing carried by the truck frame, a screw and nut occupying the casing, the screw having a shank extending outside of the casing, load operating mechanism mounted on the truck frame and connected with said shank, worm wheel teeth carried by the nut, a worm meshing with said teeth, and an electric motor the armature of which is connected with the worm, the casing described being separable, one part carrying a housing for a portion of the screw and for a part of the worm wheel and the worm, and the other part forming a portion of the worm wheel housing and having an extension forming a cap over the projecting end of the screw.

3. The combination with a truck frame, of an oscillating casing carried thereby, a longitudinally movable screw therein having its shank projecting out of the casing, a nut in the casing, a worm wheel and worm in the casing connected with the nut, an electric motor mounted on the casing and having its armature shaft coupled with the worm, and lifting mechanism carried by the truck and operated by the longitudinal movement of said screw.

4. In a truck, the combination of a frame, a load-supporting device pivotally connected with the frame, a longitudinally movable rod adapted to move the load-supporting device, a screw on said rod, a nut for the screw, a worm wheel connected with the nut, a worm engaging the worm wheel, an electric motor having its armature shaft coupled with the worm, and an oscillating frame carrying the motor, the gearing, and the nut.

5. In a truck, the combination with a frame, of a load receiving platform mounted thereon, said platform being adapted to move upwardly, a motor for operating said platform, a couple comprising two interengaging members, one of said members being associated with the platform and the other being connected with the motor, and an oscillating frame carried by the truck frame and pivoted thereto intermediate the motor and the platform.

6. In a truck, the combination of a frame, a movable load carrier carried thereby, a screw connected with the load carrier, a nut for the screw carrying worm teeth, frictionally secured thereon, an electric motor, a worm meshing with the worm teeth and connected to the armature shaft of the motor, and a pivotally mounted casing carrying the nut, worm and the motor.

7. In a truck, the combination of a housing provided with means for carrying a battery, a rearwardly extending frame, a load carrier mounted on said frame, an electric motor located within the housing beneath the battery and adapted to be driven thereby, a nut geared with the motor, a screw extending from the nut rearwardly and connected with the load carrier, and means for pivotally mounting the motor, nut and screw, whereby they may swing as the load carrier moves.

8. The combination of a housing, a frame extending therefrom, a movable load raising mechanism mounted on and adapted to extend above the extended portion of the frame, a casing pivotally carried in the housing, a screw within said casing, connected at its rear end to the said mechanism, a nut within the casing engaging the screw, an electric motor bodily movable with the casing and gearing between the armature shaft of the motor and the nut.

9. In an industrial truck, the combination of a front housing, a rearwardly extending sill frame therefrom, load raising mechanism carried by the extension of the sill frame, a pair of bearings carried by the housing, an oscillating hollow frame having trunnions mounted in said bearings, a screw connected with the load raising mechanism, and extending into the hollow frame, a nut within the hollow frame on the screw, an electric motor whose frame is rigidly connected with the hollow frame to move therewith, and gearing connecting the armature shaft of the motor with the nut.

10. In a truck of the character described, the combination of a frame, a load raising mechanism connected therewith, a hollow casing pivotally mounted on the truck frame, a screw, the outer end of which is pivotally connected with the load raising mechanism, a nut for the screw, said casing having a chamber for the screw, and a communicating chamber for the nut, an electric motor mounted on the casing to move therewith, and gearing between the armature shaft of the motor and the nut.

11. In a truck of the character described, the combination of a truck frame, load manipulating mechanism carried thereby, a hollow casing pivotally carried by the truck frame, a screw and nut occupying the casing, the screw having a shank extending outside of the casing and connected with said mechanism, worm wheel teeth carried by the nut, a worm meshing with said teeth, and an electric motor the armature of which is connected with the worm, the casing described being separable, one part having trunnions whereby it is pivotally mounted and carrying a housing for a portion of the screw and for a part of the worm wheel and the worm, and the other part forming a portion of the worm wheel housing and having an extension forming a cap over the projecting end of the screw.

12. In an industrial truck, the combination of a front housing carrying a battery, a sill frame extending rearwardly from the housing, load manipulating mechanism mounted on the sill frame, a pivotally mounted casing within the housing, a nut within the casing, a screw extending from said nut out of the casing rearwardly and pivotally connected with the load manipulating mechanism, and a motor adapted to rotate said nut.

13. In a truck of the character described, the combination of a load supporting mechanism, a separable casing, having a tubular portion, a nut carrying worm wheel teeth mounted in the casing, a worm mounted in a communicating partially tubular portion of said casing and meshing with said teeth, an electric motor having its armature shaft connected with the worm, and a screw occupying the nut and extending out of the casing and pivotally connected with the load supporting mechanism.

14. In a truck of the character described, the combination of a frame, load supporting mechanism, movably connected therewith, an oscillating casing mounted on the frame, a nut in the casing, an electric motor having its frame rigidly connected with the casing and its armature shaft geared with the nut, a screw occupying the nut and extending out of the casing, and connected with the load supporting mechanism, and a stuffing box carried by the casing and surrounding the shank of the screw.

15. The combination of a truck frame, load supporting mechanism mounted thereon, a screw pivotally mounted and connected with the load supporting mechanism, the load supporting mechanism being so mounted that the longitudinal movement of the screw moves the load supporting mechanism and at the same time rocks the screw on its pivot, a nut for the screw, a motor geared with the nut, and an oscillating frame carried by the truck frame and carrying the screw, nut and motor, said oscillating frame being pivotally mounted between the nut, gearing, and motor on one side, and the load supporting mechanism on the other.

16. In a truck, the combination of a truck frame, a power raising mechanism pivotally mounted on the truck frame, such power raising mechanism comprising a screw and nut couple, and an electric motor geared with the rotary member of such couple, and load raising mechanism connected with the longitudinally moving member of the screw and nut couple and so mounted that the longitudinal movement of said member may move said load raising mechanism and at the same time rock said member on its pivot, said pivot being located between the motor, gearing and nut on one side, and the load raising mechanism on the other, whereby the motor, gearing and nut, may act as a counter balance.

17. In a truck, the combination of a housing, a sill frame extending therefrom, a movable load carrier connected with the sill frame, a screw connected with the load carrier, a pivotally mounted casing carried by the housing into which the screw extends, a nut for the screw within the casing, an electric motor having its armature geared with the nut, said motor being carried by the casing to move bodily, and a magnetic brake carried by the motor casing, and bodily movable therewith and adapted to stop the rotation of the armature.

18. In a truck, the combination of a front housing, a rearwardly extending frame, a bodily raisable platform mounted above said frame, a motor carried by the housing for raising the platform, a screw extending from a point within the housing to the platform, a nut within the housing on the screw, gearing between the motor and the nut, and a casing pivotally mounted within the housing and enclosing the screw, nut and gearing, said motor being mounted on said casing.

19. In an industrial truck, the combination of a front housing, a rearwardly extending sill frame, a raisable platform over the extension of the sill frame, a battery box within the housing, an elevating electric motor within the housing beneath the battery box, and a raising connection between said elevating motor and the platform comprising a nut and screw geared with the armature shaft of the motor and connected to the platform, said motor and raising connection being oscillatably mounted within said housing.

20. In a truck, of the character described, the combination of a truck frame and an elevating platform movably connected therewith, a hollow casing carried by the truck frame, a screw and nut occupying the casing, the screw having a shank extending outside of the casing and connected with the platform, worm wheel teeth carried by the nut, a worm meshing with said teeth, and an electric motor the armature of which is connected with the worm, the casing described being separable, one part carrying a housing for a portion of the screw and for a part of the worm wheel and the worm, and the other part forming a portion of the worm wheel housing and having an extension forming a cap over the projecting end of the screw.

21. In a truck, the combination of a raisable platform, a nut and screw, one member of which is connected with the platform, a motor for driving the other member of such connection and an oscillating device carried by the truck frame and completely enclosing the nut and screw, said screw having a shank adapted to extend through said device, said motor being mounted on said oscillating device, and means whereby relative movement between said nut and screw causes said platform to be moved longitudinally while being raised.

22. In a truck, the combination of a frame, load supporting mechanism movably carried thereby, a motor, raising mechanism between the motor and load supporting mechanism to enable the motor to elevate the load, and a pivotal support for the motor and raising mechanism, located between the motor and load supporting device whereby the motor may act as a counter balance.

23. The combination of a housing, a frame extending therefrom, a platform above the extended portion of the frame and connected therewith in a manner to cause it to rise when moved longitudinally, a casing pivotally carried in the housing, a screw within said casing, connected at its rear end to the platform, a nut within the casing engaging the screw, a motor bodily movable with the casing, and gearing between the armature shaft of the motor and the nut.

24. In an industrial truck, the combination of a front housing, a rearwardly extending sill frame therefrom, a raisable platform carried above the extension of the sill frame, a pair of bearings carried by the housing, an oscillating hollow frame having trunnions mounted in said bearings, a screw connected with the platform and extending into the hollow frame, a nut within the hollow frame on the screw, an electric motor whose frame is rigidly connected with the hollow frame to move therewith, and gearing connecting the armature shaft of the motor with the nut.

25. In a truck of the character described, the combination of a frame, a raisable platform connected therewith, a hollow casing pivotally mounted on the truck frame, a screw, the lower end of which extends diagonally rearwardly and is pivotally connected with the platform, a nut for the screw, said casing having a chamber for the screw, and a communicating chamber for the nut, an electric motor mounted on the casing to move therewith, and gearing between the armature shaft of the motor and the nut.

26. In a truck of the character described, the combination of a truck frame, an elevating platform, parallel links connecting them, a hollow casing pivotally carried by the truck frame, a screw and nut occupying the casing, the screw having a shank extending outside of the casing and connected with the platform, worm wheel teeth carried by the nut, a worm meshing with said teeth, and an electric motor the armature of which is connected with the worm, the casing described being separable, one part having trunnions whereby it is pivotally mounted and carrying a housing for a portion of the screw and for a part of the worm wheel and the worm, and the other part forming a portion of the worm wheel housing and having an extension forming a cap over the projecting end of the screw.

27. In an industrial truck, the combination of a front housing carrying a battery, a sill frame extending rearwardly from the housing, a raisable platform above the sill frame, parallel links connecting the platform with the sill frame, a pivotally mounted casing within the housing, a nut within the casing, a screw extending from said nut out of the casing diagonally downward and rearwardly and pivotally connected with the front end of the platform, and an electric motor adapted to rotate said nut.

28. In a truck, of the character described, the combination of a raisable platform, a separable casing, a nut carrying worm-wheel teeth mounted in the casing, a worm mounted in a communicating casing and meshing with said teeth, an electric motor having its armature shaft connected with the worm, a screw occupying the nut and extending out of the casing and pivotally connected with the platform, and a stuffing box carried by the casing and surrounding the shank of the screw.

29. In a truck of the character described, the combination of a frame, a raisable platform movably connected therewith in a manner to cause its elevation when moved longitudinally, an oscillating casing mounted on the frame, a nut in the casing, an electric motor having its frame rigidly connected with the casing and its armature shaft geared with the nut, a screw occupying the nut and extending out of the casing, and connected with the platform, and a stuffing box carried by the casing and surrounding the shank of the screw.

30. In a truck, the combination of a frame, a raisable platform carried thereby, a screw connected with the platform, a nut for the screw carrying worm teeth, an electric motor, a worm meshing with the worm teeth and connected to the armature shaft of the motor, and a pivotally mounted separable casing carrying the nut, worm and the motor.

31. The combination with a truck frame, of a raisable platform, an oscillating frame, an electric motor, and suitable mechanism including a screw, both carried by said oscillating frame and adapted to raise the platform, said oscillating frame being pivoted between the motor and platform, and a brake for the armature of the motor bodily movable with the motor casing.

32. In a truck, the combination of a housing, a sill frame extending therefrom, a raisable platform connected with the sill frame, a screw connected with the platform, a pivotally mounted casing carried by the housing into which the screw extends, a nut for the screw within the casing, an electric motor having its armature geared with the nut, said motor being carried by the casing to move bodily, and a magnetic brake carried by the motor casing and bodily movable therewith and adapted to stop the rotation of the armature.

33. In a truck, a frame, a load receiving platform, movably mounted thereon and arranged to move upwardly, platform elevating means including a thrust rod adapted to move in one direction to elevate said platform and to move in an opposite direction to lower the platform, a motor, reduction gearing and a power transmitting couple, and means for pivotally supporting said couple, reduction gearing and motor on a transverse axis located between the motor and platform.

34. In a truck, a frame having a low rear extension, front and rear wheels supporting the frame, a load receiving platform above said extension, said platform being arranged to move upwardly while remaining parallel to its lowered position, platform elevating means including a thrust rod adapted to move in one direction to elevate said platform and to move in an opposite direction to lower the platform, an electric motor adjacent said thrust rod, a power transmitting rotary couple including a nut and screw between said motor and thrust rod, compactly arranged reduction gearing directly connecting said motor and said couple, said reduction gearing consisting of meshing peripherally toothed rotary members, the driving member of which is mounted on the armature shaft of said motor and the driven member on the rotary element of the power transmitting couple, a single gear box housing the reduction gearing, and means for pivotally supporting the motor and gearing on a transverse axis between the motor and platform.

35. In a truck, the combination of a frame, load supporting mechanism movably carried thereby, a motor and raising mechanism connected with the motor and the load supporting mechanism to enable the motor to elevate the load, said motor and raising mechanism being coupled together and supported as a unit on an intermediate horizontal pivot whereby they may act as a lever of the first class to partially counter balance the load supporting mechanism.

36. In a truck, the combination of a frame, load supporting mechanism carried thereby, a motor, raising mechanism including a screw and nut couple geared with the motor and connected with the load supporting mechanism, said motor and raising mechanism being mounted in such manner that they may swing in a vertical plane about an intermediate axis and thereby partially counter balance the load supporting mechanism.

Signed at Cleveland, Ohio, this 21st day of February, 1919.

CLYDE E. COCHRAN.